(12) United States Patent
Lee et al.

(10) Patent No.: US 6,270,545 B1
(45) Date of Patent: Aug. 7, 2001

(54) CYCLONE FOR MEASURING AND CONTROLLING AMOUNT OF SUSPENDED DUST

(75) Inventors: Ken Won Lee, Powell, OH (US); Yifang Zhu, Beijing (CN); Min Cheol Kim, Kwangju (KR); Michael R. Kuhlman, Columbus, OH (US); Young Ok Park, Taejeon (KR)

(73) Assignee: Kwangju Institute of Science and Technology (KR)

( * ) Notice: Subject to any disclaimer, the term of this patent is extended or adjusted under 35 U.S.C. 154(b) by 0 days.

(21) Appl. No.: 09/517,784

(22) Filed: Mar. 2, 2000

(30) Foreign Application Priority Data

Mar. 10, 1999 (KR) .............................................. 1999-7941

(51) Int. Cl.[7] .................................................. B01D 45/12
(52) U.S. Cl. ............................................. 55/345; 55/459.1
(58) Field of Search ........................ 55/345, 346, 459.1, 55/DIG. 34; 210/512.2, 256

(56) References Cited

U.S. PATENT DOCUMENTS

| 1,023,082 | * | 4/1912 | Kluge . | |
| 1,601,938 | * | 10/1926 | Campbell . | |
| 1,897,195 | * | 2/1933 | Howden . | |
| 2,252,581 | * | 8/1941 | Saint-Jacques . | |
| 2,802,280 | * | 8/1957 | Sylvest . | |
| 3,885,933 | * | 5/1975 | Putney | 55/397 |
| 3,960,734 | * | 6/1976 | Zagorski | 55/459.1 |
| 5,090,976 | * | 2/1992 | Dyson | 55/337 |
| 6,042,628 | * | 3/2000 | Nishikiori et al. | 55/337 |

FOREIGN PATENT DOCUMENTS

386215- * 4/1965 (CH) .

* cited by examiner

Primary Examiner—David A. Simmons
Assistant Examiner—Frank M. Lawrence
(74) Attorney, Agent, or Firm—Martine & Penilla, LLP

(57) ABSTRACT

Disclosed is a multiple-stage cyclone including a double-stage cyclone and a triple-stage cyclone. The triple-stage cyclone comprises an outer cylindrical body having an upper end which is closed by an upper plate and a lower portion which is formed as a downward converging pipe, the outer cylindrical body possessing an air inlet which is defined on a circumferential outer surface thereof adjoining the upper end; a first inner cylindrical body secured to an inner surface of the upper plate and having an upper portion which is formed as an upward converging pipe, the first inner cylindrical body being arranged inside the outer cylindrical body in a manner such that a first cylindrical space exists therebetween; a second inner cylindrical body secured to the downward converging pipe and having an upper portion which is inserted into the first inner cylindrical body in a manner such that a second cylindrical space exists therebetween; and a discharge pipe having a lower portion which is inserted into the second inner cylindrical body in a manner such that a third cylindrical space exists therebetween and an upper end which is fastened to the upper plate in a manner such that the upper end of the discharge pipe projects upward through the upper plate, the discharge pipe defining an air outlet.

5 Claims, 3 Drawing Sheets

[FIG 1]
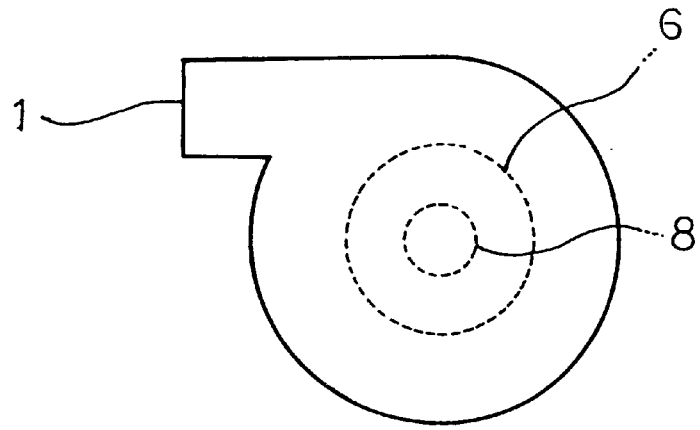
[FIG 2a]
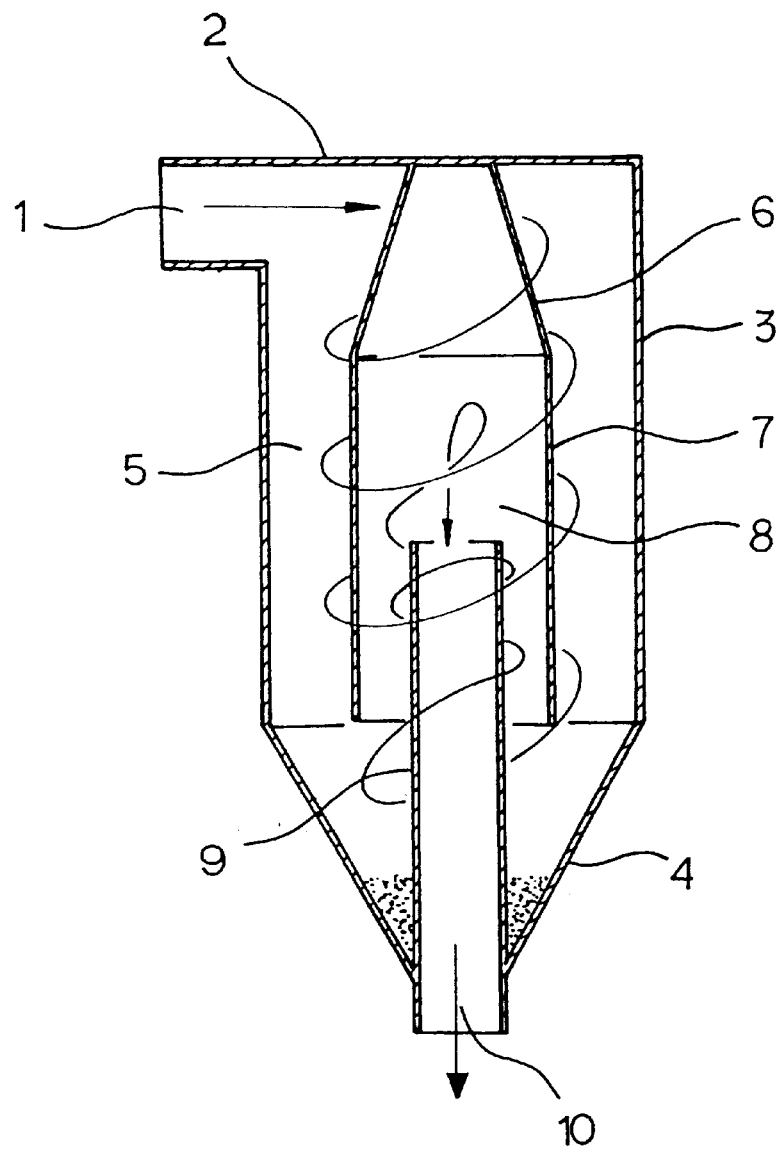

[FIG 2b]
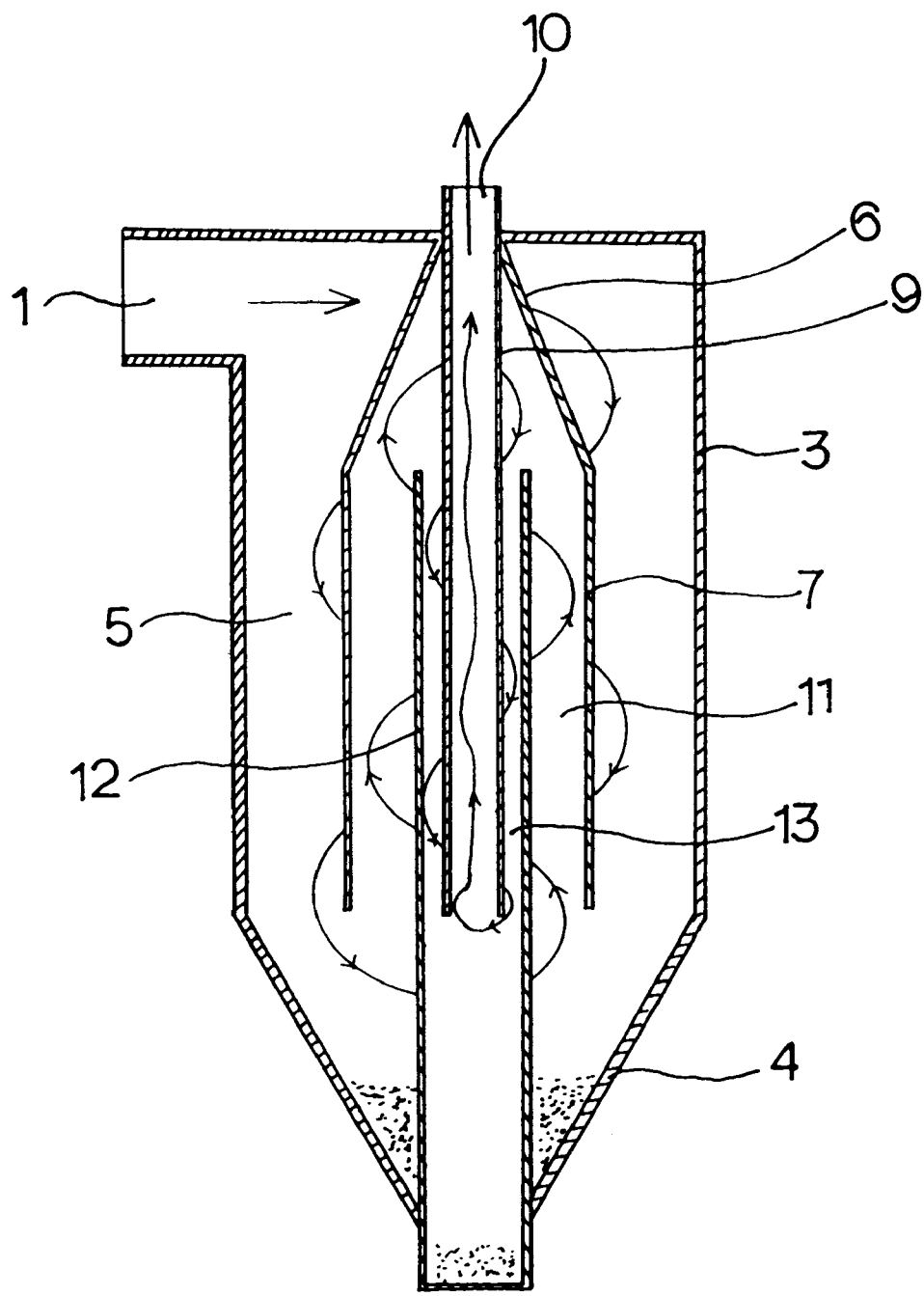

[FIG 3a]
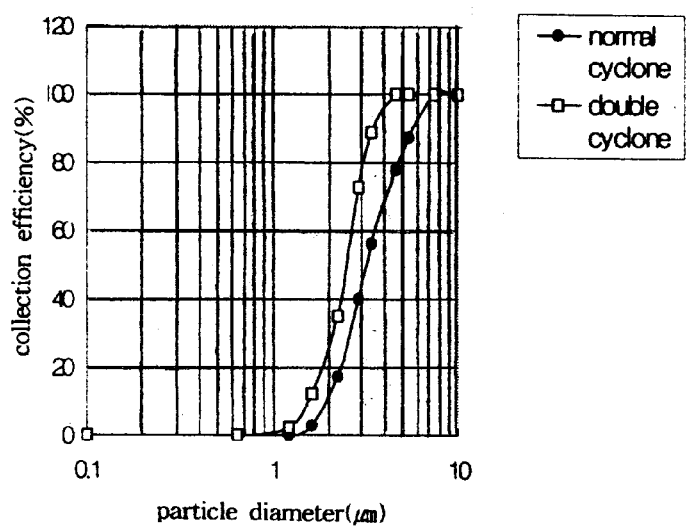
[FIG 3b]
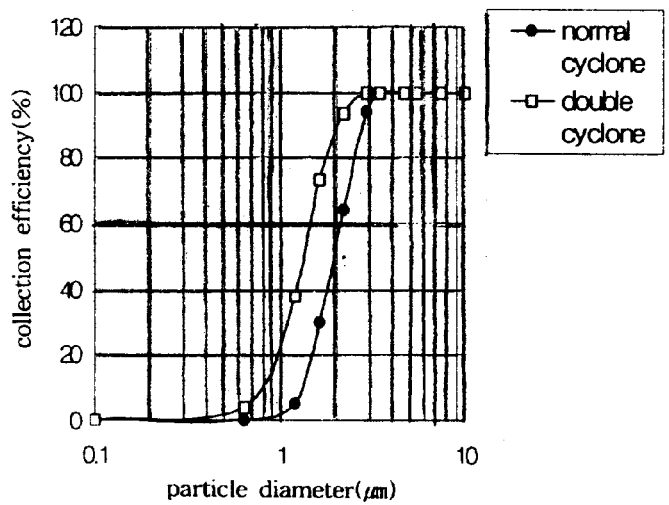

CYCLONE FOR MEASURING AND CONTROLLING AMOUNT OF SUSPENDED DUST

BACKGROUND OF THE INVENTION

1. Field of the Invention

The present invention relates to a multiple-stage cyclone including a double-stage cyclone and a triple-stage cyclone, which is used for measuring or controlling an amount of suspended dust contained in air.

2. Description of the Related Art

Generally, particulate substances (suspended dust) are considered as a major element which causes air pollution, and are generated naturally or artificially. Most of natural particulate substances have a size which is no less than 2.5 $\mu$m, and are mainly generated through a mechanical crushing procedure of soil-originated dust and saline particles which are produced by action of the wind. On the contrary, artificial suspended dust is composed of particles having a size which is substantially no greater than 2.5 $\mu$m, and are mainly generated by chemical combustion of a matter, vehicle exhaust gas and a manufacturing procedure of a chemical material. Particulate substances can also be generated from gaseous substances. Each of the gaseous substances grows from a size of a molecule to a size of a fine particle while experiencing condensation and agglomeration procedures. These gaseous substances not only are increased in their sizes, but also include noxious sulfur dioxide gas and volatile organic compound (VOC) thereby to exert detrimental effects to the human body. Particles discharged from a pollution source have diverse sizes, and a noxiousness degree against the human body varies depending upon a size distribution of the particles and a chemical composition of the particles.

Currently, as an apparatus for controlling an amount of suspended dust, that is, particles, an impactor, a cyclone, a wet scrubber, a filter dust collector or an electrostatic precipitator has been widely used. Also, as a method for measuring an amount of suspended dust, a method which utilizes a principle of an impactor, a cyclone, a diffusion battery, an aerodynamic particle sizer or a differential mobility particle sizer, has been widely used.

Among the above-mentioned apparatuses for controlling an amount of suspended dust, the cyclone exerts centrifugal force to particles while swirling gas which contains suspended dust, and, with the aid of the centrifugal force, the particles are separately collected. Specifically, because the cyclone can be easily designed and fabricated and convenience can be ensured upon using the cyclone, the cyclone is broadly used in a field which is associated with measuring of a particle size and controlling an amount of suspended dust. While the cyclone has been mainly used for controlling deleterious particles which are included in exhaust gas, the cyclone can be used as a preprocessing apparatus of an electrostatic precipitator or a filter dust collector, or can be separately used.

SUMMARY OF THE INVENTION

Accordingly, the present invention has been made in an effort to solve the problems occurring in the related art, and an object of the present invention is to provide a multiple-stage cyclone including a double-stage cyclone and a triple-stage cyclone, which is designed to enable particles contained in air to be collected in a multi-stepwise manner while the air passes through a plurality of cylindrical spaces defined inside an outer cylindrical body.

In order to achieve the above object, according to the present invention, there is provided a multiple-stage cyclone suitable for measuring and controlling an amount of suspended dust, comprising: an outer cylindrical body having an upper end which is closed by an upper plate and a lower portion which is formed as a downward converging pipe, the outer cylindrical body possessing an air inlet which is defined on a circumferential outer surface thereof adjoining the upper end; a first inner cylindrical body secured to an inner surface of the upper plate and having an upper portion which is formed as an upward converging pipe, the first inner cylindrical body being arranged inside the outer cylindrical body in a manner such that a first cylindrical space exists therebetween; a plurality of second inner cylindrical bodies alternately secured to the inner surface of the upper plate and the downward converging pipe in a manner such that an upper portion or a lower portion of one second inner cylindrical body is inserted into another second inner cylindrical body while one of a plurality of second cylindrical spaces exists therebetween; and a discharge pipe having an upper portion or a lower portion which is inserted into an innermost second inner cylindrical body in a manner such that a third cylindrical space exists therebetween and an upper end or a lower end which is fastened to the upper plate or the downward converging pipe, the discharge pipe defining an air outlet.

By the features of the present invention, since a high dust-control efficiency can be achieved in a narrow area, not only economy is improved, but also it is possible to prevent an electrostatic precipitator or a filter dust collector from being overly loaded, which is otherwise likely to occur due to the fact that an efficiency of a preprocessing apparatus is low. Also, because fine particles can be effectively collected, the multi-stage cyclone according to the present invention can be widely used in a field which is associated with industrial health or dust treatment engineering.

BRIEF DESCRIPTION OF THE DRAWINGS

The above objects, and other features and advantages of the present invention will become more apparent after a reading of the following detailed description when taken in conjunction with the drawings, in which:

FIG. 1 is a plan view of a double-stage cyclone in accordance with an embodiment of the present invention;

FIG. 2a is a longitudinal cross-sectional view of the double-stage cyclone of FIG. 1;

FIG. 2b is a longitudinal cross-sectional view of a triple-stage cyclone in accordance with another embodiment of the present invention;

FIG. 3a is a graph illustrating a relationship between a particle collection efficiency and a particle diameter at a flow rate of 20 l/min, wherein the curved line depicted by -●- symbols represents a conventional cyclone and the curved line depicted by -□- symbols represents the double-stage cyclone according to the present invention; and FIG. 3b is a graph illustrating a relationship between a particle collection efficiency and a particle diameter at a flow rate of 40 l/min, wherein the curved line depicted by -●- symbols represents a conventional cyclone and the curved line depicted by -□- symbols represents the double-stage cyclone according to the present invention.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 2a is a longitudinal cross-sectional view of a double-stage cyclone in accordance with a preferred embodiment of the present invention. The double-stage cyclone which is suitable for measuring and controlling an amount of suspended dust, includes an outer cylindrical body 3, an inner cylindrical body 7 and a discharge pipe 9. The outer cylindrical body 3 has an upper end which is closed by an upper plate 2 and a lower portion which is formed as a downward converging pipe 4. The outer cylindrical body 3 possesses an air inlet 1 which is defined on a circumferential outer surface thereof adjoining the upper end. The inner cylindrical body 7 is secured to an inner, that is, lower surface of the upper plate 2 and has an upper portion which is formed as an upward converging pipe 6. The inner cylindrical body 7 is arranged inside the outer cylindrical body 3 in a manner such that a first cylindrical space 5 exists therebetween. The discharge pipe 9 has an upper portion which is inserted into the inner cylindrical body 7 in a manner such that a second cylindrical space 8 exists therebetween and a lower end which is fastened to the downward converging pipe 4. The discharge pipe 9 defines an air outlet 10. At this time, the double-stage cyclone is constructed in a manner such that a diameter of the air inlet 1 is larger than a thickness of the first cylindrical space 5 and the thickness of the first cylindrical space 5 is larger than a diameter of the air outlet 9.

Air which contains suspended dust and is introduced into the double-stage cyclone through the air inlet 1, flows downward and relatively leisurely rotates around the upward converging pipe 6. Then, the air forcibly flows downward and rotates around a circumferential outer surface of the inner cylindrical body 7 while passing through the first cylindrical space 5. Thereupon, the air flows upward and rotates along a circumferential outer surface of the discharge pipe 9. Next, the air produces vortex flow in a space above the second cylindrical surface 8 and is discharged through the air outlet 10 after passing through the discharge pipe 9. Characteristics of the above-mentioned construction are in that the suspended dust which is contained in the air primarily hits against a circumferential inner surface of the outer cylindrical body 3 and at the same time falls downward due to its weight, and secondarily hits against a circumferential inner surface of the inner cylindrical body 7 and at the same time falls downward.

FIG. 2b is a longitudinal cross-sectional view of a triple-stage cyclone in accordance with another embodiment of the present invention. The triple-stage cyclone which is suitable for measuring and controlling an amount of suspended dust, includes an outer cylindrical body 3, a first inner cylindrical body 7, a second inner cylindrical body 12 and a discharge pipe 9. The outer cylindrical body 3 has an upper end which is closed by an upper plate 2 and a lower portion which is formed as a downward converging pipe 4. The outer cylindrical body 3 possesses an air inlet 1 which is defined on a circumferential outer surface thereof adjoining the upper end. The first inner cylindrical body 7 is secured to an inner surface of the upper plate 2 and has an upper portion which is formed as an upward converging pipe 6. The first inner cylindrical body 7 is arranged inside the outer cylindrical body 3 in a manner such that a first cylindrical space 5 exists therebetween. The second inner cylindrical body 12 is secured to the downward converging pipe 4 and has an upper portion which is inserted into the first inner cylindrical body 7 in a manner such that a second cylindrical space 11 exists therebetween. The discharge pipe 9 has a lower portion which is inserted into the second inner cylindrical body 12 in a manner such that a third cylindrical space 13 exists therebetween. The discharge pipe 9 further has an upper end which is fastened to the upper plate 2 in a manner such that the upper end of the discharge pipe 9 projects upward through the upper plate 2. The discharge pipe 9 defines an air outlet 10. At this time, the triple-stage cyclone is constructed in a manner such that a diameter of the air inlet 1 is larger than a thickness of the first cylindrical space 5, the thickness of the first cylindrical space 5 is larger than a thickness of the second cylindrical space 11, and the thickness of the second cylindrical space 11 is larger than a thickness of the third cylindrical space 13.

Air which contains suspended dust and is introduced into the double-stage cyclone through the air inlet 1, flows into the first inner cylindrical body 7 by the same function as that of the above-mentioned double-stage cyclone. Air inside the first inner cylindrical body 7 is finally deprived of suspended dust while passing through the third cylindrical space 13 which is defined between the second inner cylindrical body 12 and the discharge pipe 9. The air which is finally deprived of suspended dust, is discharged through the air outlet 10 out of the triple-stage cyclone after passing through the discharge pipe 9.

On the other hand, a multiple-stage cyclone which is suitable for measuring and controlling an amount of suspended dust, includes an outer cylindrical body, a first inner cylindrical body, a plurality of second inner cylindrical bodies and a discharge pipe. The outer cylindrical body has an upper end which is closed by an upper plate and a lower portion which is formed as a downward converging pipe. The outer cylindrical body possesses an air inlet which is defined on a circumferential outer surface thereof adjoining the upper end. The first inner cylindrical body is secured to an inner surface of the upper plate and has an upper portion which is formed as an upward converging pipe. The first inner cylindrical body is arranged inside the outer cylindrical body in a manner such that a first cylindrical space exists therebetween. The plurality of second inner cylindrical bodies are alternately secured to the inner surface of the upper plate and the downward converging pipe in a manner such that an upper portion or a lower portion of one second inner cylindrical body is inserted into another second inner cylindrical body while one of a plurality of second cylindrical spaces exists therebetween. The discharge pipe has an upper portion or a lower portion which is inserted into an innermost second inner cylindrical body in a manner such that a third cylindrical space exists therebetween and an upper end or a lower end which is fastened to the upper plate or the downward converging pipe. The discharge pipe defines an air outlet. By designing and fabricating the multiple-stage cyclone, it is possible to obtain a high particle collection efficiency which means high performance of the multiple-stage cyclone.

FIGS. 3a and 3b of the attached drawings illustrate performance estimation results for the double-stage cyclone among multiple-stage cyclones according to the present invention. As can be readily seen from FIGS. 3a and 3b, efficiencies of the double-stage cyclone which is fabricated according to the present invention, were compared with those of a conventional cyclone which has the same dimension as the double-stage cyclone of the present invention, by using an experimental device which is prepared by the present applicant.

Because a particle collection efficiency of a cyclone is increased to a certain extent in proportion to a flow rate of air, particle collection efficiencies of the double-stage cyclone of the present invention and of the conventional cyclone were compared with each other as the flow rate is increased. Of course, it is to be noted that, even though the flow rate is continuously increased, there exists a limit in the increase of the particle collection efficiency. Therefore, it should be considered that pressure loss can be increased in a cyclone. FIG. 3a is a graph illustrating a relationship between a particle collection efficiency and a particle diameter at a flow rate of 20 l/min. When a particle diameter is 3 μm, the double-stage cyclone of the present invention exhibits a particle collection efficiency of 74% and the conventional cyclone exhibits a particle collection efficiency of 41%. Also, when a particle diameter is 4.5 μm, the double-stage cyclone of the present invention exhibits a particle collection efficiency of 100% and the conventional cyclone exhibits a particle collection efficiency of 77%. FIG. 3b is a graph illustrating a relationship between a particle collection efficiency and a particle diameter at a flow rate of 40 l/min. As described above, because a particle collection efficiency accomplished by centrifugal force is increased to a certain extent in proportion to a flow rate of air, the more the flow rate is increased, the more the particle collection efficiency is increased. In FIG. 3b, when a particle diameter is 1.2 μm, the double-stage cyclone of the present invention exhibits a particle collection efficiency of 37% and the conventional cyclone exhibits a particle collection efficiency of 5.4%. Also, when a particle diameter is 2.2 μm, the double-stage cyclone of the present invention exhibits a particle collection efficiency of 93.3% and the conventional cyclone exhibits a particle collection efficiency of 64%. Based on these experiment results, it was found that the double-stage cyclone of the present invention exhibits an increased particle collection efficiency when compared to the conventional cyclone. Accordingly, the cyclone of the present invention can be widely used for measuring an amount of suspended dust and in various industrial fields.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A double-stage cyclone suitable for measuring and controlling an amount of suspended dust, comprising:

an outer cylindrical body having an upper end which is closed by an upper plate and a lower portion which is formed as a downward converging pipe, the outer cylindrical body possessing an air inlet which is defined on a circumferential outer surface thereof adjoining the upper end;

an inner cylindrical body secured to an inner surface of the upper plate and having an upper portion which is formed as an upward converging pipe, the inner cylindrical body being arranged inside the outer cylindrical body in a manner such that a first cylindrical space exists therebetween; and a discharge pipe having an upper portion which is inserted into the inner cylindrical body in a manner such that a second cylindrical space exists therebetween and a lower end which is fastened to the downward converging pipe, the discharge pipe defining an air outlet.

2. The double-stage cyclone as claimed in claim 1, wherein a diameter of the air inlet, a thickness of the first cylindrical space and a diameter of the air outlet are determined so that they have gradually decreasing dimensions.

3. A triple-stage cyclone suitable for measuring and controlling an amount of suspended dust, comprising:

an outer cylindrical body having an upper end which is closed by an upper plate and a lower portion which is formed as a downward converging pipe, the outer cylindrical body possessing an air inlet which is defined on a circumferential outer surface thereof adjoining the upper end;

a first inner cylindrical body secured to an inner surface of the upper plate and having an upper portion which is formed as an upward converging pipe, the first inner cylindrical body being arranged inside the outer cylindrical body in a manner such that a first cylindrical space exists therebetween;

a second inner cylindrical body secured to the downward converging pipe and having an upper portion which is inserted into the first inner cylindrical body in a manner such that a second cylindrical space exists therebetween; and a discharge pipe having a lower portion which is inserted into the second inner cylindrical body in a manner such that a third cylindrical space exists therebetween and an upper end which is fastened to the upper plate in a manner such that the upper end of the discharge pipe projects upward through the upper plate, the discharge pipe defining an air outlet.

4. The triple-stage cyclone as claimed in claim 3, wherein a diameter of the air inlet, a thickness of the first cylindrical space, a thickness of the second cylindrical space and a thickness of the third cylindrical space are determined so that they have gradually decreasing dimensions.

5. A multiple-stage cyclone suitable for measuring and controlling an amount of suspended dust, comprising:

an outer cylindrical body having an upper end which is closed by an upper plate and a lower portion which is formed as a downward converging pipe, the outer cylindrical body possessing an air inlet which is defined on a circumferential outer surface thereof adjoining the upper end;

a first inner cylindrical body secured to an inner surface of the upper plate and having an upper portion which is formed as an upward converging pipe, the first inner cylindrical body being arranged inside the outer cylindrical body in a manner such that a first cylindrical space exists therebetween;

a plurality of second inner cylindrical bodies alternately secured to the inner surface of the upper plate and the downward converging pipe in a manner such that an upper portion or a lower portion of one second inner cylindrical body is inserted into another second inner cylindrical body while one of a plurality of second cylindrical spaces exists therebetween; and a discharge pipe having an upper portion or a lower portion which is inserted into an innermost second inner cylindrical body in a manner such that a third cylindrical space exists therebetween and an upper end or a lower end which is fastened to the upper plate or the downward converging pipe, the discharge pipe defining an air outlet.

* * * * *